United States Patent
Tsukamoto et al.

(10) Patent No.: US 10,294,384 B2
(45) Date of Patent: May 21, 2019

(54) FLUORORESIN-ALUMINUM OXIDE MIXED DISPERSION AND METHOD OF MANUFACTURING THE SAME

(71) Applicants: JAPAN MATEX CO., LTD., Sennan-shi, Osaka (JP); Kawaken Fine Chemicals Co., Ltd., Tokyo (JP)

(72) Inventors: Katsuro Tsukamoto, Sennan (JP); Yuzo Nakamura, Sennan (JP); Yuhi Hosoi, Sennan (JP); Yosuke Kondo, Echizen (JP); Naofumi Nagai, Tokyo (JP); Fujio Mizukami, Tokyo (JP)

(73) Assignees: JAPAN MATEX CO., LTD., Osaka (JP); Kawaken Fine Chemicals Co., Ltd., Tokyo (JP)

( * ) Notice: Subject to any disclaimer, the term of this patent is extended or adjusted under 35 U.S.C. 154(b) by 0 days.

(21) Appl. No.: 15/619,839

(22) Filed: Jun. 12, 2017

(65) Prior Publication Data

US 2018/0163073 A1    Jun. 14, 2018

(30) Foreign Application Priority Data

Dec. 14, 2016  (JP) ................. 2016-242351

(51) Int. Cl.
   *C08K 3/22*     (2006.01)
   *C09D 127/12*   (2006.01)
   *C09D 127/18*   (2006.01)

(52) U.S. Cl.
   CPC ......... *C09D 127/18* (2013.01); *C09D 127/12* (2013.01); *C08K 3/22* (2013.01); *C08K 2003/2227* (2013.01)

(58) Field of Classification Search
   CPC ...... C09D 127/12; C09D 127/18; C08K 3/22; C08K 2003/2227
   USPC ......................................... 524/430
   See application file for complete search history.

(56) References Cited

U.S. PATENT DOCUMENTS

2010/0261809 A1 * 10/2010 Nam ................ C08K 3/22
                                                    523/335

FOREIGN PATENT DOCUMENTS

| JP | 08-258228 A   | 10/1996 |
| JP | 2006-117900 A | 5/2006  |
| JP | 2007-119769 A | 5/2007  |
| JP | 2008-115335 A | 5/2008  |
| JP | 2008-115336 A | 5/2008  |
| JP | 2012-219126 A | 11/2012 |

* cited by examiner

*Primary Examiner* — Angela C Scott
(74) *Attorney, Agent, or Firm* — Kelly & Kelley, LLP

(57) ABSTRACT

The present invention aims to provide a fluororesin-aluminum oxide mixed dispersion wherein both fluororesin particle and aluminum oxide particle uniformly float and disperse in an aqueous solvent. The fluororesin-aluminum oxide mixed dispersion is obtained by mixing aqueous dispersion of fluororesin particle and aluminum oxide particle sol, wherein both the fluororesin particle and the aluminum oxide particle float and disperse, and wherein the dispersion state is stably maintained for three days or more. A solid product obtained by evaporation and scattering of the solvent from the above-described fluororesin-aluminum oxide mixed dispersion has a heat resistance of not less than 330° C.

12 Claims, 4 Drawing Sheets

FLUORORESIN-ALUMINUM OXIDE MIXED DISPERSION AND METHOD OF MANUFACTURING THE SAME

BACKGROUND OF THE INVENTION

Filed of Invention

The present invention relates to a coating liquid for coating the surfaces of various kinds of materials such as metal, carbon, plastics, glass, ceramics, and wood, and the surfaces of products made of these materials, a liquid for impregnating fibers and powders of the above described materials, and a method of manufacturing the liquids.

Description of Related Art

A fluororesin has excellent heat and cold resistance, has high resistance to various chemicals including an acid or an alkali, i.e., high chemical resistance and corrosion resistance, has also incombustible property, provides high electric insulation and low dielectric loss, provides nonadhesive and nonwettable characteristics so that it can repel water and oil, and provides low friction property and proper elasticity, compared with general plastics and organic polymers, such as polyethylene and polypropylene. Accordingly, the fluororesin can be used for coating the surfaces of various materials and products, such as a mold material, a container, an electric wire, a thermometer, various sensors, a gasket, a packing, and a frying pan. These coatings are usually performed, for example, by lining of a fluororesin film, coating and impregnation of the fluororesin particle dispersion. Various kinds of such fluororesin films and dispersions are commercially available and new products also have been developed (for example, see Japanese Unexamined Patent Application Publication No. 2006-117900).

As well known in the art, we can say that a fluororesin product generally has higher heat resistance than a usual organic polymer product, while it is thermally deteriorated at two hundreds and several tens of degrees. Thus, attention is required even if the fluororesin product is used at a temperature close to 200° C. for a long time. If the fluororesin product is used at higher temperature, it will be thermally deteriorated rapidly, increasing a risk that any toxic gas, such as fluorine gas, hydrogen fluoride gas, and fluoric acid, will be emitted. Accordingly, any measure or method for improving heat resistance of Teflon (registered trademark) resin and trapping the above-described toxic gas generate by degradation of fluororesin to control the external emission of the toxic gas.

To plastics consisting of not only fluororesin but also various organic polymers, are usually added fibers and fine particles of various metal oxides and metals as a filler, in order to enhance their processability, weather resistance, durability, stiffness, shock resistance, slidability, wear resistance, fire retardancy, heat resistance, sound insulation, gas barrier property, or the like, or in order to improve surface properties, such as antistatic property and friction. Such an additive (filler) includes various kinds of additives, such as talc, mica, silica, titania, alumina, magnesia, graphite, molybdenum sulfide, calcium carbonate, and iron powder, and are selected and used according to purposes (Journal of The Society of Rubber Science and Technology, Japan, the $75^{th}$ volume, No. 8, 330-332 (2002); Plastics Age, April Issue, 2006, 72-80; and Journal of The Society of Rubber Science and Technology, Japan, the $82^{nd}$ volume, No. 2, 61-66 (2009)).

It is known that a hydroxyl group containing aluminum oxide, i.e., alumina, having in particular, a hydroxyl group, such as boehmite and gibbsite causes release and/or phase change of water with heating and thus is useful as a heat resistance providing agent (filler) or a flame retardant filler that controls/prevents overheating. These are actually added to a thermosetting resin such as unsaturated polyester, acryl, phenol, epoxy, polyurethane, and melamine, rubber elastomers such as natural rubber and synthetic rubber, and a thermoplastic resins such as acryl and polyethylene, in order to provide heat resistance and flame retardation ((Journal of The Society of Rubber Science and Technology, Japan, the $75^{th}$ volume, No. 8, 330-332 (2002)).

However, there has been little report showing that heat resistance and fire retardancy of fluororesin was improved and enhanced by addition and mixing of alumina, in particular, a hydroxyl group containing aluminum oxide, specifically, aluminum hydroxide, gibbsite, bialite, boehmite, and diaspore. No effect of the hydroxyl group containing aluminum oxide on the heat resistance and the fire retardancy of fluororesin has been confirmed based on clear experimental facts.

Furthermore, there is no product or description of a mixed dispersion of fluororesin particle-dispersed aqueous solution or emulsion and a hydroxyl group containing aluminum oxide sol, so called, alumina sol. This is possibly because there is essentially little aqueous dispersion of inorganic particles suitable for mixing with aqueous dispersion of fluororesin particle, and because the alumina sol itself easily increases its viscosity and gelates, thereby lacking preservation stability. Accordingly, the aqueous dispersion of fluororesin particle and metal oxide filler liquid (sol) is mostly mixed with silica sol or ORGANO silicate solution that has excellent viscous stability (Japanese Unexamined Patent Application Publication No. 2006-117900; Japanese Unexamined Patent Application Publication No. 2007-119769; Japanese Unexamined Patent Application Publication No. 2008-115335; Japanese Unexamined Patent Application Publication No. 2008-115336; Japanese Unexamined Patent Application Publication No. 08-258228; Japanese Unexamined Patent Application Publication No. 2012-219126).

Japanese Unexamined Patent Application Publication No. 2007-119769; Japanese Unexamined Patent Application Publication No. 2008-115335; and Japanese Unexamined Patent Application Publication No. 2008-115336 actually describe that in the preparation of a uniformly mixed and dispersed liquid with the mixing of fluororesin emulsion and colloidal sol solution of an inorganic particle, not only silicon oxide (silica) but also titanium oxide, zeolite, aluminum oxide, zinc oxide, and antimony pentoxide are preferably used as an inorganic particle, and further silicon carbide, silicon nitride, aluminum nitride, lead oxide, tin oxide, magnesium oxide, etc. can also be used, but all the examples are limited to silica. The cited documents describe no example on colloidal solution of the above-described inorganic particle other than silica, and further refer to or describe nothing about property, composition, or constitution of the inorganic particle sol to be used for the mixing. Only substance names of the inorganic particle sol are described in those documents.

Furthermore, Japanese Unexamined Patent Application Publication No. 2007-119769; Japanese Unexamined Patent Application Publication No. 2008-115335; and Japanese Unexamined Patent Application Publication No. 2008-115336, in particular, Japanese Unexamined Patent Application Publication No. 2007-119769, clearly describe the followings: if the fluororesin-silica mixed dispersion obtained by mixing of aqueous dispersion of fluororesin and silica sol is applied to a base material and dried, fluororesin primary particle and silica nano particle separate and aggregate in a process of drying the mixture, and then silica nano particle aggregate with a size of several micrometers appears on the surface of the membrane after calcination (heat treatment) and silica would be unevenly distributed. It is not appropriate to directly use the mixture without any further process, but essential to add an acid to a uniformly mixed and dispersed liquid (pH adjustment) or aggregate the uniformly mixed and dispersed liquid all at once with lyophilization or the like in order to achieve the uniform distribution of the silica after the drying.

As described above, no mixed dispersion of fluororesin particle-dispersed aqueous dispersion or emulsion and alumina sol is not commercially available or specifically illustrated as an example in any document etc. This shows that it is not easy to prepare a mixed and dispersed liquid of inorganic particles other than silicon oxide-based inorganic particles and fluororesin. And Japanese Unexamined Patent Application Publication No. 2007-119769 reveals that it is more difficult to achieve the uniform distribution of the inorganic particles in a solid mixture obtained by evaporating and drying the mixed and dispersed liquid.

SUMMARY OF THE INVENTION

The present invention aims to provide a fluororesin-aluminum oxide mixed dispersion where both fluororesin particle and aluminum oxide particle uniformly float and disperse in an aqueous solvent.

In the light of the present situation, the inventors widely searched for a combination of aqueous dispersion of fluororesin particle or emulsion and a metal oxide colloidal sol, and repeated a process of trials and errors with extensive research in order to find a suitable method of combining and blending the best combinations. They finally succeeded in developing a mixed dispersion (sol) where fluororesin particles and aluminum oxide particles are uniformly floating and dispersed in an aqueous solvent.

The invention of a first aspect relates to a fluororesin-aluminum oxide mixed dispersion obtained by mixing aqueous dispersion of fluororesin particle and aluminum oxide particle sol, wherein both the fluororesin particle and the aluminum oxide particle float and disperse, and wherein the dispersion state is stably maintained for three days or more.

The invention of a second aspect relates to the fluororesin-aluminum oxide mixed dispersion of the first aspect, wherein a solid product obtained by evaporation and scattering of a solvent from the above-described fluororesin-aluminum oxide mixed dispersion has a heat resistance of not less than 330° C.

The invention of a third aspect relates to the fluororesin-aluminum oxide mixed dispersion of the first or the second aspect, wherein an aluminum oxide is uniformly distributed and dispersed in the above-described solid product obtained by evaporation and scattering of the solvent from the above-described fluororesin-aluminum oxide mixed dispersion.

The invention of a fourth aspect relates to the fluororesin-aluminum oxide mixed dispersion of the first to third aspects, wherein the aqueous dispersion of fluororesin particle has a pH of 3.5-10.2, and wherein the above-described fluororesin particle is a resin particle consisting of a polymer or a copolymer of a monomer selected from tetrafluoroethylene, hexafluoropropylene, chlorotrifluoroethylene, perfluoro (alkyl vinyl ether), vinylidene fluoride, and vinyl fluoride.

The invention of a fifth aspect relates to the fluororesin-aluminum oxide mixed dispersion of the first to fourth aspects, wherein the aluminum oxide particle in the above-described aluminum oxide particle sol is a hydroxyl (OH) group containing aluminum oxide particle.

The invention of a sixth aspect relates to the fluororesin-aluminum oxide mixed dispersion of the fifth aspect, wherein the above-described hydroxyl group containing aluminum oxide particle sol has a pH of 2.5-7.0, and wherein the hydroxyl group containing aluminum oxide particle in the sol is boehmite and diaspore [composition formula: AlOOH], and the size of particles is 5-4500 nm.

The invention of a seventh aspect relates to the fluororesin-aluminum oxide mixed dispersion of the fifth or sixth aspect, wherein a weight ratio of the fluororesin particles to $Al_2O_3$ content of the hydroxyl group containing aluminum oxide particle in the above-described fluororesin-aluminum oxide mixed dispersion is 3.1-100, and wherein a weight ratio of water to the $Al_2O_3$ content is 10-120.

The invention of an eighth aspect relates to the fluororesin-aluminum oxide mixed dispersion of the fifth to seventh aspects, wherein pH is 3.5-10.2.

The invention of a ninth aspect relates to a method of manufacturing the fluororesin-aluminum oxide mixed dispersion comprising a step of mixing aqueous dispersion of fluororesin particle having a pH of 3.5-10.2, and a hydroxyl group containing aluminum oxide particle sol having a pH of 2.5-7.0 under normal pressure at the temperature of 5 to 100° C., wherein a weight ratio of the fluororesin particles to the $Al_2O_3$ content of the above-described alumina particle in the dispersion is 3.1 to 100 and a weight ratio of water to the $Al_2O_3$ content is 10 to 120.

Effects of the Invention

In the fluororesin-aluminum oxide mixed dispersion of the present invention, particles of the fluororesin and aluminum oxide do not aggregate or assemble so that they do not precipitate, and are mixed and uniformly dispersed in an aqueous solvent in their original size or a size close to the original size even if they somewhat aggregated, i.e., a size where they can float and disperse in the aqueous solvent against gravity. Thus, with extremely simple operation and work of applying, impregnating, or dipping the mixed dispersion of the present invention to/in a coated object and then drying and heat-treating the same, alumina-added Teflon (registered trademark) layered coating can be applied with any thickness and even with no gap between the particles because accurate accumulation of the particles occurs. The simple operation and work of using the mixed dispersion of the present invention is not only energy saving, but also very safe and economically very advantageous.

DETAILED DESCRIPTION OF THE INVENTION

Figure 1:
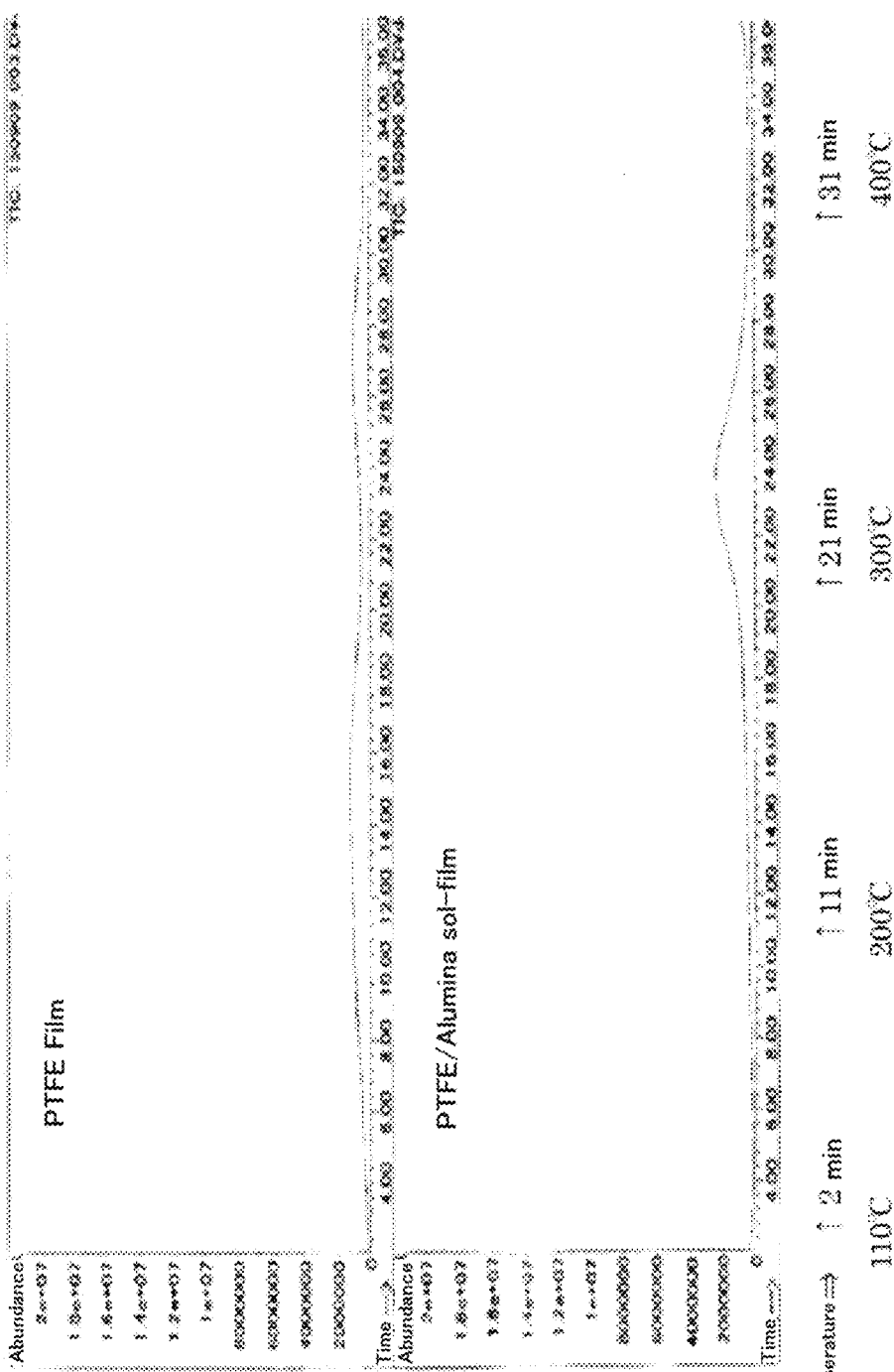
FIG. 1A is a gas chromatography mass spectrometry of the fluororesin powder obtained by evaporating, solidifying, and drying the aqueous dispersion of fluororesin particle.
FIG. 1B is a gas chromatography mass spectrometry of a mixed particle of the fluororesin and alumina obtained by evaporating, solidifying, and drying the fluororesin-aluminum oxide mixed dispersion of the present invention.

<Constitution of the Fluororesin-Aluminum Oxide Mixed Dispersion>

The fluororesin-aluminum oxide mixed dispersion of the present invention usually comprises a fluororesin particle, an aluminum oxide particle, and water, wherein the fluororesin particle and the aluminum oxide particle float and disperse in the dispersion.

The fluororesin particle as used herein is a resin particle comprising a polymer or a copolymer of a monomer selected from tetrafluoroethylene, hexafluoropropylene, chlorotrifluoroethylene, perfluoro (alkyl vinyl ether), vinylidene fluoride, and vinyl fluoride, etc., and those dispersed in water among the particles are conveniently used for preparation of the fluororesin-aluminum oxide mixed dispersion of the present invention.

The aluminum oxide particle of the present invention means the aluminum oxide particle of aluminum oxide [composition formula: $Al_2O_3$], amorphous aluminum hydroxide, Gibbsite, bialite [composition formula: $Al(OH)_3$] and/or boehmite and diaspore [composition formula: AlOOH]. An aqueous colloidal sol of these particles is used to obtain a fluororesin-aluminum oxide mixed dispersion of the present invention.

Generally, the fluororesin particle and the metal oxide particle are easily sedimented or precipitated as they become larger. Therefore, in order for the particles of the fluororesin and the aluminum oxide to maintain their floating and dispersion state in the aqueous solvent for a long period of time, their molecular weights and particle sizes are preferably small. More particularly, fluororesin particle has an average molecular weight of preferably $1 \times 10^4$-$1 \times 10^7$, more preferably $2 \times 10^4$-$1 \times 10^7$. If the average molecular weight is smaller than such ranges, a coated film is likely to be fragile. If the average molecular weight is larger than the ranges, PTFE particles are less likely to fuse due to extremely high melt viscosity. Moreover, the fluororesin particle has a particle size within a range of preferably 100-500 nm, and aluminum oxide particle has a particle size within a range of preferably 5-4500 nm. However, as long as the fluororesin particle floats and disperses stably and uniformly in the aqueous solvent, the above-described respective ranges of the molecular weight and the particle size of the fluororesin particle are not specifically defined or mentioned.

What is important for uniform floating and dispersion of the particle in the solvent is not only affinity with the solvent but also consideration and idea for preventing aggregation of the particles. It is because that the aggregation increases viscosity and thus solidification and gelation occur to induce precipitation. Therefore, it is necessary to prevent assembly and aggregation of the particles. The measures for the prevention include, for example, allowing the particles to have the same electric charge (to be electrically charged) and repulse each other, and surrounding the particles with a surfactant to form a composite micelle.

In the case of the metal oxide colloid, if the micelles are formed, the particles are repulsed each other by charging and dispersed in many of the micelles. A charge amount of a particle is closely related to pH of a solution, that is, extremely sensitive to pH. Therefore, pH of an aluminum oxide particle sol used for preparation of the fluororesin-aluminum oxide mixed dispersion of the present invention also has an appropriate range for preventing the aggregation. More particularly, the aluminum oxide particle sol used in the present invention has a pH of less than 7.5, more preferably 2.5-7.0 to prevent aggregation between the aluminum oxide particles and between the aluminum oxide particle and the fluororesin particle. If the aluminum oxide particle sol has a pH of 7.5 or more, in particular, 9 or more, i.e., becoming alkaline, mixing of the aluminum oxide particle sol and the aqueous dispersion of fluororesin particle often induces gelation, precipitation, phase separation, or the like, depending on types of the aqueous dispersion of fluororesin particle to be used. It makes difficult to obtain a mixed and uniformly-dispersed solution.

Blending of the fluororesin-aluminum oxide mixed dispersion is significantly affected not only by pH of the used aluminum oxide particle sol but also by pH of the aqueous dispersion of fluororesin particle. It is because pH of a mixture obtained by mixing the aluminum oxide particle sol and the aqueous dispersion of fluororesin particle changes and the pH change results in precipitation of the aluminum hydroxide depending on the used aluminum oxide particle sol. Accordingly, the pH of the aqueous dispersion of the fluororesin particle used for blending of the fluororesin-aluminum oxide mixed dispersion is 3.3-10.2, preferably 3.5-10.0.

As described above, addition of a surfactant is often very effective in stabilization of the floating and dispersion state of the particle. While the surfactant is selected in the light of affinity with particles of the aluminum oxide and the fluororesin and a solvent, and electrostatic repulsion of a produced composite micelle, etc., the surfactant is not an essential ingredient as long as a dispersion is obtained by simple mixing of the aqueous dispersion of the fluororesin particle with the aluminum oxide particle sol. However, the period when the dispersion state is stably maintained by addition of an adequate amount of an appropriate surfactant may often be prolonged, and thus the present invention does not exclude addition of the surfactant. In some cases, a surfactant effective for prolongation of the stable period, for example, a nonionic surfactant such as polyoxyalkylene-alkyl ether and polyoxyalkylene alkylphenyl ether may be preferably added.

When a surfactant exists in the fluororesin-aluminum oxide mixed dispersion, it maintains the uniform dispersion state through van der Waals interaction or electrostatic interaction, etc., that is, by a certain kind of intermolecular association with the aluminum oxide particle and/or the fluororesin particle. Pre-modifying the surface of the fluororesin particle and/or the aluminum oxide particle with a substance which acts instead of and similarly to the surfactant or adding a modifier having such a role to respective dispersion of the fluororesin particle and/or the aluminum oxide particle is effective in maintaining the uniform floating and dispersion state of the fluororesin-aluminum oxide mixed dispersion for a long period of time. More specifically, such a processing includes, for example, modifying the surface of the aluminum oxide particle with a kind of silane coupling agent, etc. and adding the silane coupling agent, etc. to the aluminum oxide particle sol.

Unsurprisingly, aggregation of particles is closely related to their concentration. As the concentration increases, viscosity increases and the particle is more likely to not only solidify and gelate but also aggregate and precipitate. Therefore, lowering of concentration of both the fluororesin particle and the aluminum oxide particle in the fluororesin-aluminum oxide mixed dispersion, i.e., low particle concentration, is effective in achieving the mixed and uniformly dispersed state of the fluororesin particle and the aluminum oxide particle in the fluororesin-aluminum oxide mixed dispersion and retaining the state for a long period of time. However, if the particle concentration is low, a film obtained by operation such as application and impregnation is thin and a relatively large amount of energy will be consumed to evaporation and scattering of a solvent in heat treatment processes such as drying and burning, which is uneconomical. Thus, from this viewpoint, higher particle concentration is preferable. From such a viewpoint, the fluororesin-aluminum oxide mixed dispersion preferably has a weight ratio of 3-100 of fluororesin particles and 10-120 of water to the $Al_2O_3$ content of the hydroxyl group containing aluminum oxide particle in the dispersion.

<Method of Manufacturing a Fluororesin-Aluminum Oxide Mixed Dispersion>

The fluororesin-aluminum oxide mixed dispersion according to the present invention is prepared by mixing an aqueous dispersion of the fluororesin particle and an aluminum oxide particle sol under stirring. The pH of the aluminum oxide particle sol is preferably within a range of 2.5-7.0. A lower limit of a weight ratio range of the fluororesin particle to the $Al_2O_3$ content of the aluminum particle in the mixture is preferably 3.1, more preferably 3.2. An upper limit is preferably 100, more preferably 54.0. A lower limit of a weight ratio range of water to the $Al_2O_3$ content of aluminum particle in the mixture is preferably 10, more preferably 15.0. An upper limit is preferably 120, more preferably 51.0. There is no particular regulation on the stirring in the mixing. Optimal stirring conditions are suitably selected in consideration of particle concentration, viscosity and temperature of a mixture, etc. at the time of mixing. While the temperature at the time of stirring is usually a room temperature, it can be lowered below and raised above the room temperature in consideration of viscosity of the mixed dispersion, etc. and can be suitably selected depending on the situation. There is also no particular regulation on pressure at the time of mixing and stirring, and they are usually conducted under normal pressure. However, if pressurization or depressurization is necessary in terms of viscosity or concentration of a solvent, pressure can be suitably selected depending on the purpose.

<Materials>

In completion of the present invention, aqueous dispersion or emulsion of fluororesin particle, and colloidal sol of metal oxide particle practically used in the examples or comparative examples are as follows. In the specification, the symbols from A-1 to A-3 and B-1 to B-9 are used.

Aqueous Dispersion of Fluororesin Particle

A-1: Polyflon (Registered trademark) D-111 manufactured by DAIKIN INDUSTRIES, LTD. (Solid Content of PTFE: 60 wt. %, Average molecular weight: $2\times10^4$-$1\times10^7$, Particle size: 0.25 µm, pH: 9.7)

A-2: AD911E manufactured by ASAHI GLASS CO., LTD. (Solid Content of PTFE: 60 wt. %, Average molecular weight: $2\times10^4$-$1\times10^7$, Particle size: 0.25 µm, pH: 10)

A-3: 31-JR manufactured by Du Pont-Mitsui Fluorochemicals Company, Ltd. (Solid Content of PTFE: 60 wt. %, Average molecular weight: $2\times10^4$-$1\times10^7$, Particle size: 0.25 µm, pH: 10.5)

Particle size refers to an average particle size of PTFE primary particle.

Aluminum Oxide Particle Sol

B-1: Alumina sol-1 OA manufactured by Kawaken Fine Chemicals, Co., Ltd. (wt. % of $Al_2O_3$: 9.8-10.2, Particle size: 5-15 nm, Viscosity mPa·s (25° C.): <50, pH: 3.4-4.2)

B-2: Alumina sol-A2 manufactured by Kawaken Fine Chemicals, Co., Ltd. (wt. % of $Al_2O_3$: 9.8-10.2, Particle size: 10-20 nm, Viscosity mPa·s (25° C.): <200, pH: 3.4-4.2)

B-3: Alumina sol-CSA-110AD manufactured by Kawaken Fine Chemicals, Co., Ltd. (wt. % of $Al_2O_3$: 6.0-6.4, Particle size: 5-15 nm, Viscosity mPa·s (25° C.): <50, pH: 3.8-4.5)

B-4: Alumina sol-F1000 manufactured by Kawaken Fine Chemicals, Co., Ltd. (wt. % of $Al_2O_3$: 4.8-5.2, Particle size: 1,400 nm, Viscosity mPa·s (25° C.): <1,000, pH: 2.9-3.3)

B-5: Alumina sol-F3000 manufactured by Kawaken Fine Chemicals, Co., Ltd. (wt. % of $Al_2O_3$: 4.8-5.2, Particle size: 2,000-4,500 nm, Viscosity mPa·s (25° C.): <1,000, pH: 2.7-3.3)

B-6: AS200 manufactured by NISSAN CHEMICAL INDUSTRIES, LTD. (wt. % of $Al_2O_3$: 10.5, Particle size (nm): Unknown, pH: 4.7)

B-7: Biral Al-L7 manufactured by Taki Chemical Co., Ltd. (wt. % of $Al_2O_3$: 7, Particle size: 5-10 nm, pH: 8)

B-8: Biral Al-M15 manufactured by Taki Chemical Co., Ltd. (wt. % of $Al_2O_3$: 15, Particle size: 30 nm, pH: 7-9)

B-9: Alumina sol-5N manufactured by Kawaken Fine Chemicals, Co., Ltd. (wt. % of $Al_2O_3$: 5.0, Particle size: 20 nm, Viscosity mPa·s (25° C.): 3.5, pH: 6.5)

Particle size refers to a range of particle size measured in each aluminum oxide particle sol.

EXAMPLE

Hereinafter, the present invention will be described in more detail with reference to examples, but the invention is not limited by the examples. Various examples and comparative examples are set forth below and Tables which summarized each result are shown as follows.

<Influence of Materials>

Various types of aqueous dispersion of fluororesin particle and aluminum oxide particle sol were used as examples.

Example 1

Aqueous dispersion of fluororesin particle; A-1: 300 g
Aluminum oxide particle sol; B-2: 150 g
Mixing temperature: Room temperature
Stirring time: 60 minutes
Result: A fluororesin-alumina mixed dispersion was prepared which has 43% of solid content mass of Teflon (Registered trademark) resin particle-alumina boehmite particle. The dispersion did not solidify/gelate, aggregate/precipitate, and separate phases for 180 days or more. The viscosity was nearly unchanged before and after preparation and the flowability was very satisfactory. Thus, the mixed dispersion could be used as a coating liquid or an impregnation liquid for coating fluororesin without any trouble after 200 days.

Example 2

Aqueous dispersion of fluororesin particle; A-1: 30 g
Aluminum oxide particle sol; B-3: 20 g
Mixing temperature: Room temperature
Stirring time: 30 minutes
Result: The mixed dispersion did not solidify/gelate, aggregate/precipitate, and separate phases for 28 days or more. The viscosity was nearly unchanged before and after preparation and the flowability was very satisfactory. Thus, the mixed dispersion could be used as a coating liquid or an impregnation liquid for coating fluororesin without any trouble after 30 days.

Example 3

Aqueous dispersion of fluororesin particle; A-2: 30 g
Aluminum oxide particle sol; B-2: 20 g
Mixing temperature: Room temperature
Stirring time: 30 minutes
Result: The mixed dispersion did not solidify/gelate, aggregate/precipitate, and separate phases for 28 days or more. The viscosity was nearly unchanged before and after preparation and the flowability was very satisfactory. Thus, the mixed dispersion could be used as a coating liquid or an impregnation liquid for coating fluororesin without any trouble after 30 days.

Example 4

Aqueous dispersion of fluororesin particle; A-1: 30 g
Aluminum oxide particle sol; B-4: 20 g
Mixing temperature: Room temperature
Stirring time: 60 minutes
Result: The mixed dispersion did not solidify/gelate, aggregate/precipitate, and separate phases for 14 days or more. The viscosity significantly increased after preparation and the flowability considerably decreased over time. However, the flowability was not completely lost. Also, it was recognized that the flowability significantly improved, i.e., recovered by oscillation, shaking, or the like. Accordingly, with the mixed dispersion shaken before use, it could be used as a coating liquid or an impregnation liquid for coating fluororesin without any trouble after 15 days.

Example 5

Aqueous dispersion of fluororesin particle; A-2: 30 g
Aluminum oxide particle sol; B-4: 20 g
Mixing temperature: Room temperature
Stirring time: 60 minutes
Result: The mixed dispersion did not solidify/gelate, aggregate/precipitate, and separate phases for 14 days or more. The viscosity significantly increased after preparation and the flowability considerably decreased over time. However, the mixed dispersion was stirred or shaken to recover its flowability. Accordingly, with the mixed dispersion shaken before use, it could be used as a coating liquid or an impregnation liquid for coating fluororesin without any trouble after 21 days.

Example 6

Aqueous dispersion of fluororesin particle; A-2: 42 g
Aluminum oxide particle sol; B-5: 42 g
Mixing temperature: Room temperature
Stirring time: 50 minutes
Result: The mixed dispersion did not solidify/gelate, aggregate/precipitate, and separate phases for 25 days or more. The viscosity significantly increased after preparation, but the flowability was not lost. Thus, the mixed dispersion could be used as a coating liquid or an impregnation liquid for coating fluororesin without any trouble after 25 days.

<Influence of Mixing Ratio>

Various mixing ratios of aqueous dispersion of fluororesin particle and aluminum oxide particle sol were used as examples.

Example 7

Aqueous dispersion of fluororesin particle; A-2: 32 g
Aluminum oxide particle sol; B-4: 8 g
Mixing temperature: Room temperature
Stirring time: 50 minutes
Result: The mixed dispersion did not solidify/gelate, aggregate/precipitate, and separate phases for 5 days or more. The viscosity was found to increase after preparation, but there was no problem for the flowability. Thus, the mixed dispersion could be used as a coating liquid or an impregnation liquid for coating fluororesin without any trouble.

Example 8

Aqueous dispersion of fluororesin particle; A-2: 32 g
Aluminum oxide particle sol; B-3: 8 g
Mixing temperature: Room temperature
Stirring time: 40 minutes
Result: The mixed dispersion did not solidify/gelate, aggregate/precipitate, and separate phases for 4 days or more. The viscosity was found to increase after preparation, but there was no problem for the flowability. Thus, the mixed dispersion could be used as a coating liquid or an impregnation liquid for coating fluororesin without any trouble.

Example 9

Aqueous dispersion of fluororesin particle; A-2: 24 g
Aluminum oxide particle sol; B-2: 16 g
Mixing temperature: Room temperature
Stirring time: 30 minutes
Result: The mixed dispersion did not solidify/gelate, aggregate/precipitate, and separate phases for 7 days or more. The viscosity was nearly unchanged before and after preparation and the flowability was very satisfactory. Thus, the mixed dispersion could be used as a coating liquid or an impregnation liquid for coating fluororesin without any trouble after 14 days.

Example 10

Aqueous dispersion of fluororesin particle; A-1: 24 g
Aluminum oxide particle sol; B-3: 16 g
Mixing temperature: Room temperature
Stirring time: 30 minutes
Result: The mixed dispersion did not solidify/gelate, aggregate/precipitate, and separate phases for 14 days or more. The viscosity was nearly unchanged before and after preparation and the flowability was very satisfactory. Thus, the mixed dispersion could be used as a coating liquid or an impregnation liquid for coating fluororesin without any trouble after 20 days.

Example 11

Aqueous dispersion of fluororesin particle; A-1: 24 g
Aluminum oxide particle sol; B-4: 16 g
Mixing temperature: Room temperature
Stirring time: 40 minutes
Result: The mixed dispersion did not solidify/gelate, aggregate/precipitate, and separate phases for three days or more. The viscosity was found to increase after preparation, but there was no problem for the flowability. Thus, the mixed dispersion could be used as a coating liquid or an impregnation liquid for coating fluororesin without any trouble.

Example 12

Aqueous dispersion of fluororesin particle; A-1: 16 g
Aluminum oxide particle sol; B-3: 24 g
Mixing temperature: Room temperature
Stirring time: 30 minutes
Result: The mixed dispersion did not solidify/gelate, aggregate/precipitate, and separate phases for 10 days or more. The viscosity was nearly unchanged before and after preparation and the flowability was very satisfactory. Thus, the mixed dispersion could be used as a coating liquid or an impregnation liquid for coating fluororesin without any trouble after 15 days.

Example 13

Aqueous dispersion of fluororesin particle; A-1: 6 g
Aluminum oxide particle sol; B-3: 18 g
Mixing temperature: Room temperature
Stirring time: 40 minutes
Result: The mixed dispersion did not solidify/gelate, aggregate/precipitate, and separate phases for 15 days or more. The viscosity was nearly unchanged before and after preparation and the flowability was very satisfactory. Thus, the mixed dispersion could be used as a coating liquid or an impregnation liquid for coating fluororesin without any trouble.

Example 14

Aqueous dispersion of fluororesin particle; A-1: 36 g
Aluminum oxide particle sol; B-1: 4 g
Mixing temperature: Room temperature
Stirring time: 40 minutes
Result: The mixed dispersion did not solidify/gelate, aggregate/precipitate, and separate phases for three days or more. The viscosity was found to slightly increase after preparation, but the flowability was sufficient. Thus, the mixed dispersion could be used as a coating liquid or an impregnation liquid for coating fluororesin without any trouble.

<Preparation of Mixed Dispersion Using Aqueous Dispersion of Fluororesin Particle in Acid pH Range>

To the aqueous dispersion of fluororesin particle described below was added acetic acid, and the pH of the aqueous dispersion of fluororesin particle was adjusted to 3.5. The pH-adjusted aqueous dispersion of fluororesin particle and the aluminum oxide particle sol were mixed, stirred, and then left to stand to confirm behavior of the mixed dispersion.

Example 15

Aqueous dispersion of fluororesin particle; A-1: 6 g
Aluminum oxide particle sol; B-1: 4 g
Mixing temperature: Room temperature
Stirring time: 30 minutes
Result: The mixed dispersion did not solidify/gelate, aggregate/precipitate, and separate phases for 5 days or more. The viscosity was nearly unchanged before and after preparation and the flowability was very satisfactory. Thus, the mixed dispersion could be used as a coating liquid or an impregnation liquid for coating fluororesin without any trouble after 5 days. The dispersion has a pH of 3.6.

<Preparation of Mixed Dispersion Using Aqueous Dispersion of Aluminum Oxide Particle Sol in Neutral pH Range>

The aqueous dispersion of fluororesin particle and the aluminum oxide particle sol in neutral pH range were used as examples to prepare a mixed dispersion. In addition, various mixing ratios of the aqueous dispersion of fluororesin particle and the aluminum oxide particle sol in neutral pH range were used.

Example 16

Aqueous dispersion of fluororesin particle; A-1: 8 g
Aluminum oxide particle sol; B-9: 2 g
Mixing temperature: Room temperature
Stirring time: 30 minutes
Result: The mixed dispersion did not solidify/gelate, aggregate/precipitate, and separate phases for 11 days or more. The viscosity was nearly unchanged before and after preparation and the flowability was very satisfactory. Thus, the mixed dispersion could be used as a coating liquid or an impregnation liquid for coating fluororesin without any trouble after 11 days.

Example 17

Aqueous dispersion of fluororesin particle; A-1: 6 g
Aluminum oxide particle sol; B-9: 4 g
Mixing temperature: Room temperature
Stirring time: 30 minutes
Result: The mixed dispersion did not solidify/gelate, aggregate/precipitate, and separate phases for 11 days or more. The viscosity was nearly unchanged before and after preparation and the flowability was very satisfactory. Thus, the mixed dispersion could be used as a coating liquid or an impregnation liquid for coating fluororesin without any trouble after 11 days.

Example 18

Aqueous dispersion of fluororesin particle; A-1: 4 g
Aluminum oxide particle sol; B-9: 6 g
Mixing temperature: Room temperature
Stirring time: 30 minutes
Result: The mixed dispersion did not solidify/gelate, aggregate/precipitate, and separate phases for 11 days or more. The viscosity was nearly unchanged before and after preparation and the flowability was very satisfactory. Thus, the mixed dispersion could be used as a coating liquid or an impregnation liquid for coating fluororesin without any trouble after 11 days.

Example 19

Aqueous dispersion of fluororesin particle; A-1: 2 g
Aluminum oxide particle sol; B-9: 8 g
Mixing temperature: Room temperature
Stirring time: 30 minutes
Result: The mixed dispersion did not solidify/gelate, aggregate/precipitate, and separate phases for or more 11 days or more. The viscosity was nearly unchanged before and after preparation and the flowability was very satisfactory. Thus, the mixed dispersion could be used as a coating liquid or an impregnation liquid for coating fluororesin without any trouble after 11 days. The dispersion had a pH of 9.03.

<Identification of pH Range of Mixed Dispersion>

To the mixed dispersion of Example 17 was added aqueous ammonia, and the mixed dispersion was pH-adjusted to 10.2 and left to stand to confirm behavior of the mixed dispersion.

Example 20

Aqueous dispersion of fluororesin particle; A-1: 6 g
Aluminum oxide particle sol; B-9: 4 g
Mixing temperature: Room temperature
Stirring time: 30 minutes
Result: The mixed dispersion did not solidify/gelate, aggregate/precipitate, and separate phases for 5 days or more. The viscosity was nearly unchanged before and after preparation and the flowability was very satisfactory. Thus, the mixed dispersion could be used as a coating liquid or an impregnation liquid for coating fluororesin without any trouble after 5 days. The dispersion has a pH of 10.2.

COMPARATIVE EXAMPLES

<Types of Aluminum Oxide Particle Sol and Influence of pH>

Various types of aluminum oxide particle sol were used as comparative examples and influence of pH was examined.

Comparative Example 1

Aqueous dispersion of fluororesin particle; A-1: 30 g
Aluminum oxide particle sol; B-6: 20 g
Mixing temperature: Room temperature
Stirring time: 60 minutes
Result: As soon as the stirring was stopped and the mixture was left to stand, the mixture was separated into two liquids.

Comparative Example 2

Aqueous dispersion of fluororesin particle; A-2: 30 g
Aluminum oxide particle sol; B-6: 20 g
Mixing temperature: Room temperature
Stirring time: 60 minutes
Result: As soon as the stirring was stopped and the mixture was left to stand, the mixture was separated into two liquids.

Comparative Example 3

Aqueous dispersion of fluororesin particle; A-1: 30 g
Aluminum oxide particle sol; B-7: 20 g
Mixing temperature: Room temperature
Stirring time: 60 minutes
Result: As soon as the stirring was stopped and the mixture was left to stand, the mixture was separated into two liquids.

Comparative Example 4

Aqueous dispersion of fluororesin particle; A-1: 30 g
Aluminum oxide particle sol; B-8: 20 g
Mixing temperature: Room temperature
Stirring time: 60 minutes
Result: As soon as the stirring was stopped and the mixture was left to stand, the mixture was separated into two liquids.

Comparative Example 5

Aqueous dispersion of fluororesin particle; A-2: 30 g
Aluminum oxide particle sol; B-7: 20 g
Mixing temperature: Room temperature
Stirring time: 60 minutes
Result: As soon as the stirring was stopped and the mixture was left to stand, the mixture was separated into two liquids.

Comparative Example 6

Aqueous dispersion of fluororesin particle; A-2: 30 g
Aluminum oxide particle sol; B-8: 20 g
Mixing temperature: Room temperature
Stirring time: 60 minutes
Result: As soon as the stirring was stopped and the mixture was left to stand, the mixture was separated into two liquids.

<Types of Aqueous Dispersion of Fluororesin Particle and Influence of pH>

Various types of aqueous dispersion of fluororesin particle were used as comparative examples and influence of pH was examined.

Comparative Example 7

Aqueous dispersion of fluororesin particle; A-3: 300 g
Aluminum oxide particle sol; B-1: 150 g
Mixing temperature: Room temperature
Stirring time: 60 minutes
Result: As soon as the stirring was stopped and the mixture was left to stand, the mixture was separated into two liquids.

Comparative Example 8

Aqueous dispersion of fluororesin particle; A-3: 300 g
Aluminum oxide particle sol; B-3: 150 g
Mixing temperature: Room temperature
Stirring time: 60 minutes
Result: As soon as the stirring was stopped and the mixture was left to stand, the mixture was separated into two liquids.

Comparative Example 9

Aqueous dispersion of fluororesin particle; A-3: 300 g
Aluminum oxide particle sol; B-2: 150 g
Mixing temperature: Room temperature
Stirring time: 60 minutes
Result: As soon as the stirring was stopped and the mixture was left to stand, the mixture was separated into two liquids.

Comparative Example 10

Aqueous dispersion of fluororesin particle; A-3: 300 g
Aluminum oxide particle sol; B-4: 150 g
Mixing temperature: Room temperature
Stirring time: 60 minutes
Result: As soon as the stirring was stopped and the mixture was left to stand, the mixture was separated into two liquids.

<Influences of Mixing Ratio>

The various mixing ratios of aqueous dispersion of fluororesin particle and aluminum oxide particle sol was used as comparative examples.

Comparative Example 11

Aqueous dispersion of fluororesin particle: A-1: 8 g
Aluminum oxide particle sol; B-2: 32 g
Mixing temperature: Room temperature
Result: As soon as they were mixed, the mixture was gelled and solidified at room temperature.

Comparative Example 12

Aqueous dispersion of fluororesin particle: A-1: 8 g
Aluminum oxide particle sol; B-4: 32 g
Mixing temperature: Room temperature
Stirring time: 60 minutes
Result: As soon as the stirring was stopped and the mixture was left to stand, the mixture was separated into two liquids.

Comparative Example 13

Aqueous dispersion of fluororesin particle: A-2: 8 g
Aluminum oxide particle sol; B-3: 32 g
Mixing temperature: Room temperature
Stirring time: 40 minutes
Result: As soon as the stirring was stopped and the mixture was left to stand, the mixture was separated into two liquids.

Comparative Example 14

Aqueous dispersion of fluororesin particle: A-2: 8 g
Aluminum oxide particle sol; B-2: 32 g
Mixing temperature: Room temperature
Stirring time: 40 minutes
Result: As soon as the stirring was stopped and the mixture was left to stand, the mixture was separated into two liquids.

The results of the examples are shown in Tables 1-3, and the results of the comparative examples are shown in Tables 4 and 5. The medium value of the range of wt. % of $Al_2O_3$ of each aluminum oxide particle sol was described in the column of wt. % of $Al_2O_3$ of aluminum oxide particle sol in the tables. In the tables, the weight ratio of fluororesin to $Al_2O_3$ was calculated using the following formula. The medium value of the range was used for the value of wt. % of $Al_2O_3$.

(amount of mixture of aqueous dispersion of fluororesin particle×wt. % of PTFE solid content/100)÷(amount of mixture of aluminum oxide particle sol×wt. % of $Al_2O_3$/100)

Also, the weight ratio of water to $Al_2O_3$ was calculated using the following formula.

[{amount of mixture of aqueous dispersion of fluororesin particle×(100-wt. % of PTFE solid content)/100}+{amount of mixture of aluminum oxide particle sol×(100-wt. % of $Al_2O_3$)/100}]÷(amount of mixture of aluminum oxide particle sol×wt. % of $Al_2O_3$/100)

In addition, if the dispersion state of the mixed dispersion after stirring was stably maintained for three days or more, "OK" was described in the column of the result in each table. On the other hand, if the state was not stably maintained for three days or more, "NG" was described in the column.

TABLE 1

| | | Example1 | Example2 | Example3 | Example4 | Example5 | Example6 |
|---|---|---|---|---|---|---|---|
| Aqueous dispersion of fluoro resin particle | Type | A-1 | A-1 | A-2 | A-1 | A-2 | A-2 |
| | Mixed weight (g) | 300 | 30 | 30 | 30 | 30 | 42 |
| | Wt. % of PTFE | 60 | 60 | 60 | 60 | 60 | 60 |
| | pH | 9.7 | 9.7 | 10 | 9.7 | 10 | 10 |
| | Molecular weight | $2 \times 10^4$~$1 \times 10^7$ | $2 \times 10^4$~$1 \times 10^7$ | $2 \times 10^4$~$1 \times 10^7$ | $2 \times 10^4$~$1 \times 10^7$ | $2 \times 10^4$~$1 \times 10^7$ | $2 \times 10^4$~$1 \times 10^7$ |
| | Particle size (nm) | 250 | 250 | 250 | 250 | 250 | 250 |
| Aluminum oxide particle sol | Type | B-2 | B-3 | B-2 | B-4 | B-4 | B-5 |
| | Mixed weight (g) | 150 | 20 | 20 | 20 | 20 | 42 |
| | pH | 3.4-4.2 | 3.8-4.5 | 3.4-4.2 | 3.4-4.2 | 3.4-4.2 | 3.4-4.2 |
| | Particle size (nm) | 10-20 | 5-15 | 10-20 | 1400 | 1400 | 2000-4500 |
| | Wt. % of $Al_2O_3$ | 10 | 6.2 | 10 | 5 | 5 | 5 |
| Weight ratio to $Al_2O_3$ | Fluoro resin | 12.0 | 14.5 | 9.0 | 18.0 | 18.0 | 12.0 |
| | Water | 17.0 | 24.8 | 15.0 | 31.0 | 31.0 | 27.0 |
| Result | | OK | OK | OK | OK | OK | OK |

TABLE 2

| | | Example7 | Example8 | Example9 | Example10 | Example11 | Example12 | Example13 | Example14 |
|---|---|---|---|---|---|---|---|---|---|
| Aqueous dispersion of fluoro resin particle | Type | A-2 | A-2 | A-2 | A-1 | A-1 | A-1 | A-1 | A-1 |
| | Mixed weight (g) | 32 | 32 | 24 | 24 | 24 | 16 | 6 | 36 |
| | Wt. % of PTFE | 60 | 60 | 60 | 60 | 60 | 60 | 60 | 60 |
| | pH | 10 | 10 | 10 | 9.7 | 9.7 | 9.7 | 9.7 | 9.7 |
| | Molecular weight | $2 \times 10^4$~$1 \times 10^7$ | $2 \times 10^4$~$1 \times 10^7$ | $2 \times 10^4$~$1 \times 10^7$ | $2 \times 10^4$~$1 \times 10^7$ | $2 \times 10^4$~$1 \times 10^7$ | $2 \times 10^4$~$1 \times 10^7$ | $2 \times 10^4$~$1 \times 10^7$ | $2 \times 10^4$~$1 \times 10^7$ |

TABLE 2-continued

|  |  | Example7 | Example8 | Example9 | Example10 | Example11 | Example12 | Example13 | Example14 |
|---|---|---|---|---|---|---|---|---|---|
| Aluminum oxide particle sol |  Particle size (nm) | 250 | 250 | 250 | 250 | 250 | 250 | 250 | 250 |
|  | Type | B-4 | B-3 | B-2 | B-3 | B-4 | B-3 | B-3 | B-1 |
|  | Mixed weight (g) | 8 | 8 | 16 | 16 | 16 | 24 | 18 | 4 |
|  | pH | 3.4-4.2 | 3.8-4.5 | 3.4-4.2 | 3.8-4.5 | 3.4-4.2 | 3.8-4.5 | 3.8-4.5 | 3.4-4.2 |
|  | Particle size (nm) | 1400 | 5-15 | 10-20 | 5-15 | 1400 | 5-15 | 5-15 | 5-15 |
|  | Wt. % of $Al_2O_3$ | 5 | 6.2 | 10 | 6.2 | 5 | 6.2 | 6.2 | 10 |
| Weight ratio to $Al_2O_3$ | Fluoro resin | 48.0 | 38.7 | 9.0 | 14.5 | 18.0 | 6.5 | 3.2 | 54.0 |
|  | Water | 51.0 | 40.9 | 15.0 | 24.8 | 31.0 | 19.4 | 17.3 | 45.0 |
| Result |  | OK | OK | OK | OK | OK | OK | OK | OK |

TABLE 3

|  |  | Example15 | Example16 | Example17 | Example18 | Example 19 | Example20 |
|---|---|---|---|---|---|---|---|
| Aqueous dispersion of fluoro resin particle | Type | A-1 | A-1 | A-1 | A-1 | A-1 | A-1 |
|  | Mixed weight (g) | 6 | 8 | 6 | 4 | 2 | 6 |
|  | Wt. % of PTFE | 60 | 60 | 60 | 60 | 60 | 60 |
|  | pH | 9.7 | 9.7 | 9.7 | 9.7 | 9.7 | 9.7 |
|  | Molecular weight | $2 \times 10^4 \sim 1 \times 10^7$ | $2 \times 10^4 \sim 1 \times 10^7$ | $2 \times 10^4 \sim 1 \times 10^7$ | $2 \times 10^4 \sim 1 \times 10^7$ | $2 \times 10^4 \sim 1 \times 10^7$ | $2 \times 10^4 \sim 1 \times 10^7$ |
|  | Particle size (nm) | 250 | 250 | 250 | 250 | 250 | 250 |
| Aluminum oxide particle sol | Type | B-1 | B-9 | B-9 | B-9 | B-9 | B-9 |
|  | Mixed weight (g) | 4 | 2 | 4 | 6 | 8 | 4 |
|  | pH | 3.4-4.2 | 6.5 | 6.5 | 6.5 | 6.5 | 6.5 |
|  | Particle size (nm) | 5-15 | 20 | 20 | 20 | 20 | 20 |
|  | Wt. % of $Al_2O_3$ | 10 | 5.0 | 5.0 | 5.0 | 5.0 | 5.0 |
| Weight ratio to $Al_2O_3$ | Fluoro resin | 9.0 | 48.0 | 18.0 | 8.0 | 3.0 | 18.0 |
|  | Water | 15.0 | 51.0 | 31.0 | 24.3 | 21.0 | 31.0 |
| Result |  | OK | OK | OK | OK | OK | OK |

TABLE 4

|  |  | Comparative example1 | Comparative example2 | Comparative example3 | Comparative example4 | Comparative example5 | Comparative example6 |
|---|---|---|---|---|---|---|---|
| Aqueous dispersion of fluoro resin particle | Type | A-1 | A-2 | A-1 | A-1 | A-2 | A-2 |
|  | Mixed weight (g) | 30 | 30 | 30 | 30 | 30 | 30 |
|  | Wt. % of PTFE | 60 | 60 | 60 | 60 | 60 | 60 |
|  | pH | 9.7 | 10 | 9.7 | 9.7 | 10 | 10 |
|  | Molecular weight | $2 \times 10^4 \sim 1 \times 10^7$ | $2 \times 10^4 \sim 1 \times 10^7$ | $2 \times 10^4 \sim 1 \times 10^7$ | $2 \times 10^4 \sim 1 \times 10^7$ | $2 \times 10^4 \sim 1 \times 10^7$ | $2 \times 10^4 \sim 1 \times 10^7$ |
|  | Particle size (nm) | 250 | 250 | 250 | 250 | 250 | 250 |
| Aluminum oxide particle sol | Type | B-6 | B-6 | B-7 | B-8 | B-7 | B-8 |
|  | Mixed weight (g) | 20 | 20 | 20 | 20 | 20 | 20 |
|  | pH | 4.7 | 4.7 | 8 | 7-9 | 8 | 7-9 |
|  | Particle size (nm) | No data | No data | 5-10 | 30 | 5-10 | 30 |
|  | Wt. % of $Al_2O_3$ | 10.5 | 10.5 | 7 | 15 | 7 | 15 |

TABLE 4-continued

|  |  | Comparative example1 | Comparative example2 | Comparative example3 | Comparative example4 | Comparative example5 | Comparative example6 |
|---|---|---|---|---|---|---|---|
| Weight ratio to Al$_2$O$_3$ | Fluoro resin | 8.5 | 8.5 | 12.9 | 6.0 | 12.9 | 6.0 |
|  | Water | 14.2 | 14.2 | 21.9 | 9.7 | 21.9 | 9.7 |
| Result |  | NG | NG | NG | NG | NG | NG |

TABLE 5

|  |  | Comparative example7 | Comparative example8 | Comparative example9 | Comparative example10 | Comparative example11 | Comparative example12 | Comparative example13 | Comparative example14 |
|---|---|---|---|---|---|---|---|---|---|
| Aqueous dispersion of fluoro resin particle | Type | A-3 | A-3 | A-3 | A-3 | A-1 | A-1 | A-2 | A-2 |
|  | Mixed weight (g) | 30 | 30 | 30 | 30 | 8 | 8 | 8 | 8 |
|  | Wt. % of PTFE | 60 | 60 | 60 | 60 | 60 | 60 | 60 | 60 |
|  | pH | 10.5 | 10.5 | 10.5 | 10.5 | 9.7 | 9.7 | 10 | 10 |
|  | Molecular weight | $2 \times 10^4 \sim 1 \times 10^7$ | $2 \times 10^4 \sim 1 \times 10^7$ | $2 \times 10^4 \sim 1 \times 10^7$ | $2 \times 10^4 \sim 1 \times 10^7$ | $2 \times 10^4 \sim 1 \times 10^7$ | $2 \times 10^4 \sim 1 \times 10^7$ | $2 \times 10^4 \sim 1 \times 10^7$ | $2 \times 10^4 \sim 1 \times 10^7$ |
|  | Particle size (nm) | 250 | 250 | 250 | 250 | 250 | 250 | 250 | 250 |
| Aluminum oxide particle sol | Type | B-1 | B-3 | B-2 | B-4 | B-2 | B-4 | B-3 | B-2 |
|  | Mixed weight (g) | 20 | 20 | 20 | 20 | 32 | 32 | 32 | 32 |
|  | pH | 3.4-4.2 | 3.8-4.5 | 3.4-4.2 | 3.4-4.2 | 3.4-4.2 | 3.4-4.2 | 3.8-4.5 | 3.4-4.2 |
|  | Particle size (nm) | 5-15 | 5-15 | 10-20 | 1400 | 10-20 | 1400 | 5-15 | 10-20 |
|  | Wt. % of Al$_2$O$_3$ | 10 | 6.2 | 10 | 5 | 10 | 5 | 6.2 | 10 |
| Weight ratio to Al$_2$O$_3$ | Fluoro resin | 9.0 | 14.5 | 9.0 | 18.0 | 1.5 | 3.0 | 2.4 | 1.5 |
|  | Water | 15.0 | 24.8 | 15.0 | 31.0 | 10.0 | 21.0 | 16.7 | 10.0 |
| Result |  | NG | NG | NG | NG | NG | NG | NG | NG |

EFFECTS OF THE INVENTION

FIG. 1A shows a chromatography mass spectrometry of fluororesin powder obtained by evaporating, solidifying and drying the aqueous dispersion of fluororesin particle. FIG. 1B shows a gas chromatography mass spectrometry of fluororesin-alumina mixed particle powder obtained by evaporating, solidifying and drying the fluororesin-aluminum oxide mixed dispersion of in Example 4. As shown in the examples, it become apparent that the aluminum oxide mixed with fluororesin has effects of improving thermal resistance of the fluororesin, inhibiting heat deterioration thereof and inhibiting generation of cracked gas thereof. That is, as shown in FIG. 1A and FIG. 1B, the fluororesin-alumina mixed particle powder obtained by evaporating, solidifying and drying the present fluororesin-aluminum oxide mixed dispersion, and the fluororesin powder obtained from aqueous dispersion of fluororesin particle with the same operation were heated as a specimen under the same condition, respectively, while the gas chromatography mass spectrometry was performed. The first decomposition peak was observed at 330° C. for the former (FIG. 1B), while the peak was observed at 240° C. for the latter (FIG. 1A). Therefore, the present invention demonstrated for the first time that the addition of alumina has a good effects of improving thermal resistance of the fluororesin solid, inhibiting heat deterioration thereof and inhibiting generation of cracked gas thereof.

Figure 2:
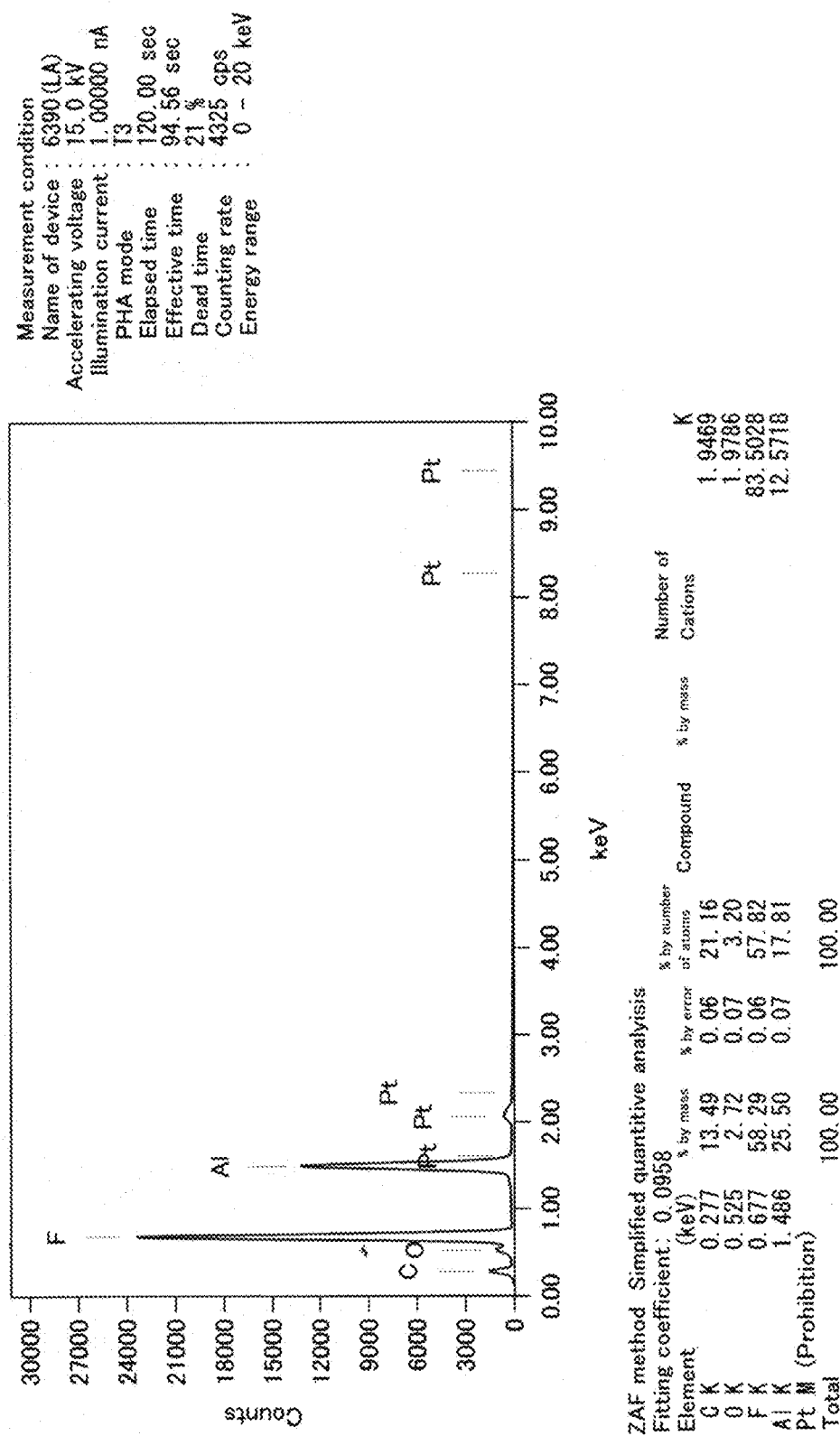
FIG. 2 is an element qualitative analysis chart of the pyrolysis residue of the alumina-added fluororesin film of the present invention.

Also, when the specimens were heated to 750° C. in the above gas chromatography mass spectrometry, the specimen of FIG. 1B provided the ash (residue) comprising fluoride and aluminum as the major components as shown in FIG. 2, but the specimen of FIG. 1A provided little ash. This actually shows the following; when the dispersion or powder containing only fluororesin particle without aluminum oxide particle was heated to 750° C., almost all of it was degraded and scattered to disappear. On the other hand, when the fluororesin-aluminum oxide mixed dispersion and the mixed particle powder obtained from the mixed dispersion were heated to 750° C., the aluminum oxide particle interacted with fluoride of fluororesin particle to prevent scatter of it, and thus, alumina is effective in trapping and capturing fluoride. Simultaneously, it is also estimated that alumina (i.e., aluminum) is uniformly dispersed and distributed in the mixed powder with the interaction of fluoride-aluminum oxide particle in even the solid obtained by drying and heating the fluororesin-aluminum oxide mixed dispersion.

Since aluminum compound such as alumina is electron-deficient Lewis acid and fluoride is Lewis base having excessive electron pair, the interaction of fluoride-aluminum oxide particle is theoretically appropriate. On the other hand, since the metal oxide in Japanese Unexamined Patent Application Publication No. 2007-119769 is silica, and the silica, unlike alumina, is not electron-deficient Lewis acid, a strong interaction with fluoride cannot be expected. Therefore, it is believed that the silica moves, aggregates and unevenly distributes in drying.

Figure 3:
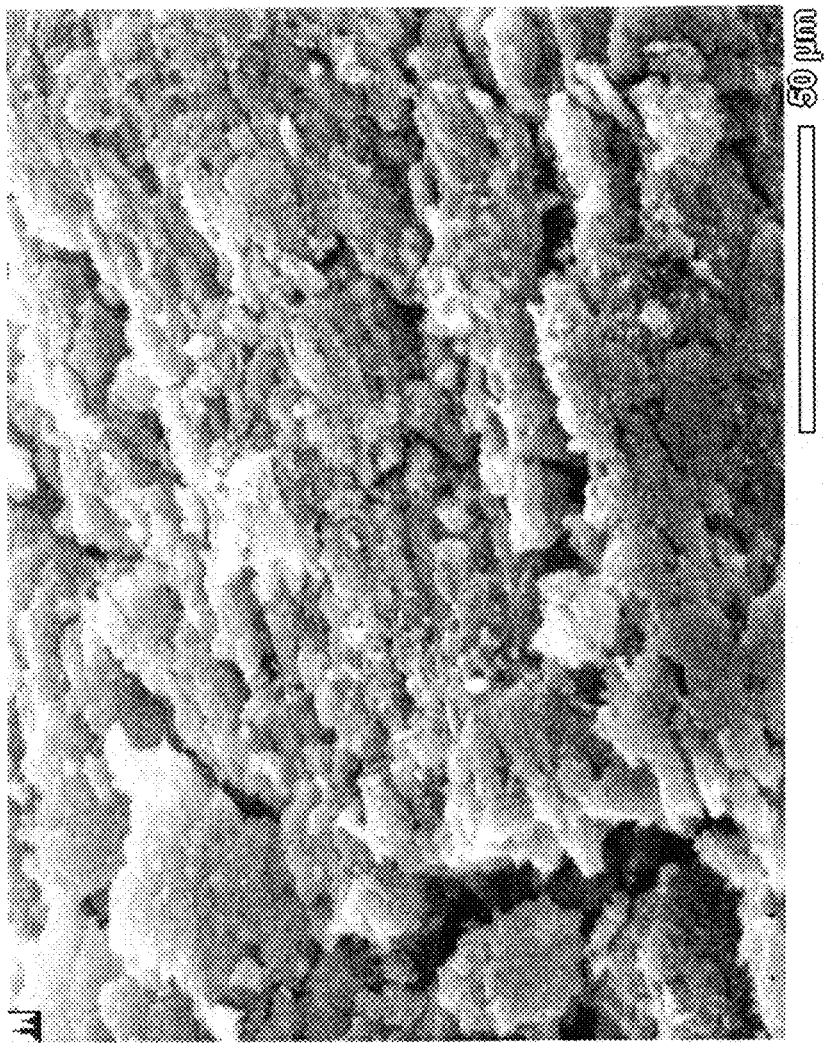
FIG. 3 is a SEM image of the powder obtained by evaporating and solidifying the fluororesin-alumina oxide mixed dispersion of the present invention.

From the observation of SEM image of the fluororesin-aluminum oxide mixed powder, the above estimation is found to be actually appropriate. FIG. 3 shows SEM image of the powder obtained by evaporating to dry fluororesin-aluminum oxide mixed dispersion in the example 4. That is, as shown in FIG. 3, what appears the silica lump in the SEM image of Japanese Unexamined Patent Application Publication No. 2007-119769 is not recognized at all in the present SEM image, and the powder has the uniform surface in the whole. Therefore, in the fluororesin-aluminum oxide mixed powder obtained in the present invention, it can be found that alumina is uniformly dispersed and distributed. Thus, in the fluororesin-aluminum oxide mixed dispersion of the present invention, after the operations such as impregnation and application without aggregating and precipitating the dispersion, only general simple drying and heating operation can distribute alumina particle uniformly without unevenness to exert heat resistance and flame-retardant effect thereof effectively.

Figure 4:
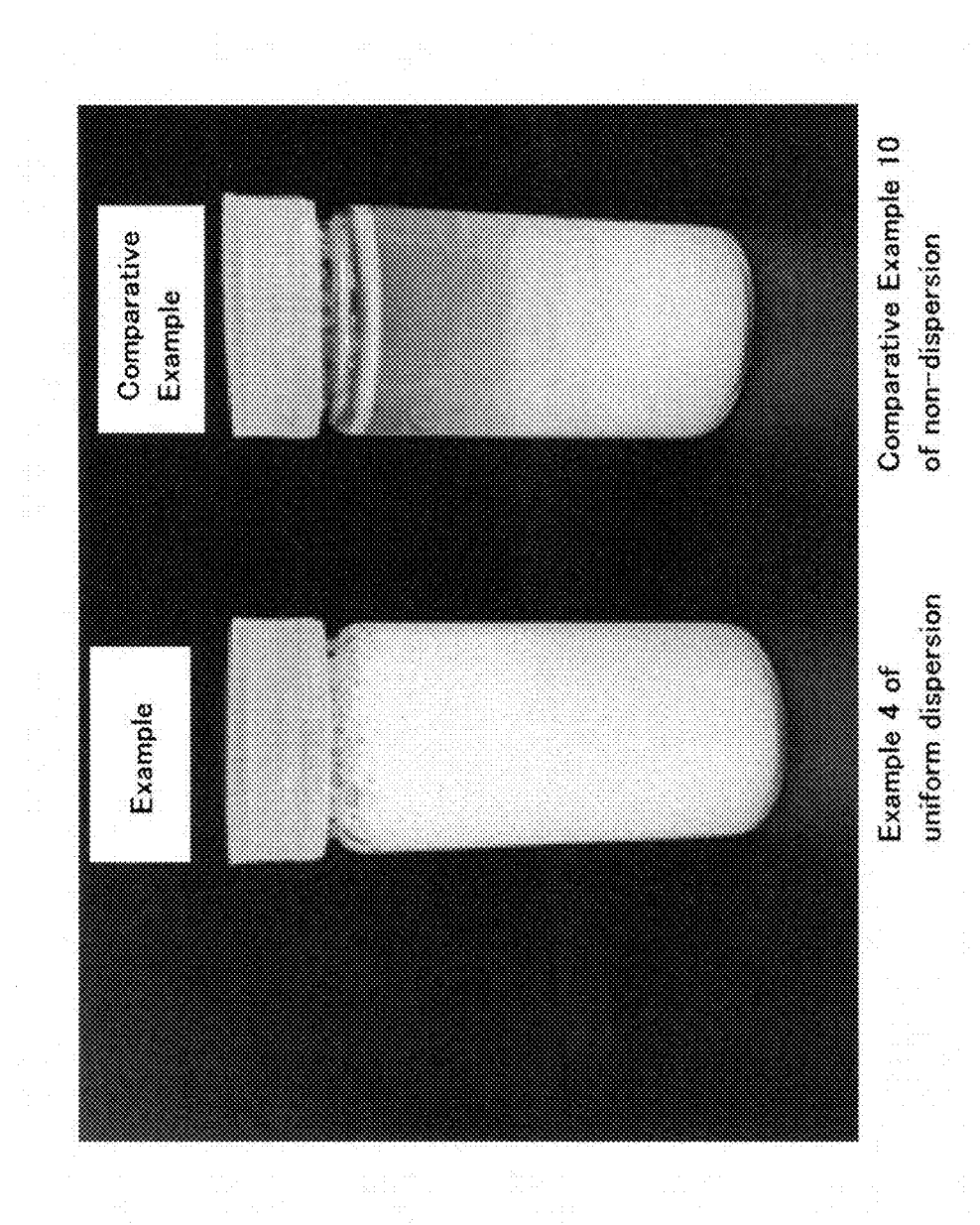
FIG. 4 is a picture of the example of the fluororesin-alumina oxide mixed dispersion of the present invention and a picture of a comparative example.

FIG. 4 shows the representative examples of uniform floating and dispersion, phase separation and gelation provided by mixing fluororesin and alumina sol in the above examples and comparative examples. It also clearly shows excellence and predominance of the uniformly floating mixed dispersion of the invention, and the utility as a coating liquid and an impregnation liquid.

APPLICATION AND EFFECT OF THE PRESENT INVENTION

After applying the above fluororesin-alumina mixed dispersion and the dispersion containing only fluororesin to the existing expansion graphite gasket substrate and SUS gasket substrate respectively, a graphite gasket coated by fluororesin containing alumina and a SUS gasket coated by only fluororesin were manufactured, and each performance as the gasket was evaluated. The test was performed with a gasket testing machine manufactured by Amtec GmbH of Germany. When the gasket coated by only fluororesin not containing alumina, whether the expansion graphite substrate or SUS substrate, was used for 3 hours under the pressure of 10 bar at 250° C., gas leaked. On the other hand, when the graphite and SUS gaskets coated by fluororesin containing alumina were used for 10 hours under the same pressure at the same temperature, the gas leak was not entirely detected.

INDUSTRIAL APPLICABILITY

The fluororesin-aluminum oxide mixed dispersion of the present invention is suitable as a coating liquid for coating the surfaces of materials such as metals, carbons, plastics, glasses, ceramics, graphite, carbon fibers or carbonated fibers and the surfaces of products made of these materials, and as an impregnation liquid for fibers or powders of these materials. Specifically, it is used as an application/coating material for coating the surface of materials or products such as electric wire, thermometer, various sensors, gasket, packing, and the like.

The invention claimed is:

1. A fluororesin-aluminum oxide mixed dispersion obtained by mixing an aqueous dispersion of fluororesin particle and an aluminum oxide particle sol, wherein both the fluororesin particle and the aluminum oxide particle float and disperse, and wherein the dispersion state is stably maintained for three or more days, wherein the aluminum oxide particle in said aluminum oxide particle sol is a hydroxyl (OH) group containing aluminum oxide particle.

2. The fluororesin-aluminum oxide mixed dispersion of claim 1, wherein a solid product obtained by evaporation and scattering of a solvent from said fluororesin-aluminum oxide mixed dispersion has a heat resistance of not less than 330° C.

3. The fluororesin-aluminum oxide mixed dispersion of claim 2, wherein an aluminum oxide is uniformly distributed and dispersed in said solid product obtained by evaporation and scattering of the solvent from said fluororesin-aluminum oxide mixed dispersion.

4. The fluororesin-aluminum oxide mixed dispersion of any of claims 1 to 3, wherein pH of the aqueous dispersion of fluororesin particle is 3.5-10.2, and wherein said fluororesin particle is a resin particle consisting of a polymer or a copolymer of a monomer selected from tetrafluoroethylene, hexafluoropropylene, chlorotrifluoroethylene, perfluoro (alkyl vinyl ether), vinylidene fluoride, and vinyl fluoride.

5. The fluororesin-aluminum oxide mixed dispersion of any of claims 1 to 3, wherein pH of said hydroxyl group containing aluminum oxide particle sol is 2.5-7.0, and wherein the hydroxyl group containing aluminum oxide particle in the sol is boehmite and diaspore where composition formula: is AlOOH, and the size of particles is 5-4500 nm.

6. The fluororesin-aluminum oxide mixed dispersion of claim 4, wherein pH of said hydroxyl group containing aluminum oxide particle sol is 2.5-7.0, and wherein the hydroxyl group containing aluminum oxide particle in the sol is boehmite and diaspore where composition formula is: AlOOH, and the size of particles is 5-4500 nm.

7. The fluororesin-aluminum oxide mixed dispersion of any one of claims 1 to 3, wherein a weight ratio of the fluororesin particles to $Al_2O_3$ content of the hydroxyl group containing aluminum oxide particle in said fluororesin-aluminum oxide mixed dispersion is 3.1-100, and wherein a weight ratio of water to the $Al_2O_3$ content is 10-120.

8. The fluororesin-aluminum oxide mixed dispersion of claim 4, wherein a weight ratio of the fluororesin particles to $Al_2O_3$ content of the hydroxyl group containing aluminum oxide particle in said fluororesin-aluminum oxide mixed dispersion is 3.1-100, and wherein a weight ratio of water to the $Al_2O_3$ content is 10-120.

9. The fluororesin-aluminum oxide mixed dispersion of claim 6, wherein a weight ratio of the fluororesin particles to $Al_2O_3$ content of the hydroxyl group containing aluminum oxide particle in said fluororesin-aluminum oxide mixed dispersion is 3.1-100, and wherein a weight ratio of water to the $Al_2O_3$ content is 10-120.

10. The fluororesin-aluminum oxide mixed dispersion of any of claims 1 to 3, wherein pH of the fluororesin-aluminum oxide mixed dispersion is 3.5-10.2.

11. The fluororesin-aluminum oxide mixed dispersion of claim 4, wherein pH of the fluororesin-aluminum oxide mixed dispersion is 3.5-10.2.

12. The fluororesin-aluminum oxide mixed dispersion of claim 6, wherein pH of the fluororesin-aluminum oxide mixed dispersion is 3.5-10.2.

* * * * *